United States Patent
Koenig et al.

(10) Patent No.: US 10,870,372 B2
(45) Date of Patent: Dec. 22, 2020

(54) VEHICLE SEAT, IN PARTICULAR MOTOR VEHICLE SEAT

(71) Applicant: Adient Luxembourg Holding S.à r.l., Luxembourg (LU)

(72) Inventors: Michael Koenig, Rodenbach (DE); Martin Reischmann, Hoehfroeschen (DE); Thomas Rau, Lohnsfeld (DE); Frank Bernhardt, Eppelheim (DE); Dirk Dubois, Hinterweidenthal (DE)

(73) Assignee: Adient Luxembourg Holding S.á r.l., Luxembourg (LU)

( * ) Notice: Subject to any disclaimer, the term of this patent is extended or adjusted under 35 U.S.C. 154(b) by 0 days.

(21) Appl. No.: 16/339,147

(22) PCT Filed: Sep. 28, 2017

(86) PCT No.: PCT/EP2017/074675
§ 371 (c)(1),
(2) Date: Apr. 3, 2019

(87) PCT Pub. No.: WO2018/065297
PCT Pub. Date: Apr. 12, 2018

(65) Prior Publication Data
US 2019/0299820 A1 Oct. 3, 2019

(30) Foreign Application Priority Data

Oct. 4, 2016 (DE) .......... 10 2016 219 143
Dec. 21, 2016 (DE) .......... 10 2016 225 834

(51) Int. Cl.
*B60N 2/235* (2006.01)
*B60N 2/20* (2006.01)

(52) U.S. Cl.
CPC ............ *B60N 2/236* (2015.04); *B60N 2/206* (2013.01)

(58) Field of Classification Search
CPC .......... B60N 2/2356; B60N 2/20; B60N 2/68; B60N 2/2821
See application file for complete search history.

(56) References Cited

U.S. PATENT DOCUMENTS 8,286,777 B2 * 10/2012 Kirubaharan ........ B60N 2/2252
192/223.1
8,931,843 B2 * 1/2015 Schuler ................ B60N 2/2252
297/367 R (Continued)

FOREIGN PATENT DOCUMENTS

DE 101 20 854 C1 8/2002
DE 103 34 220 A1 2/2005

(Continued)

*Primary Examiner* — Shin H Kim
(74) *Attorney, Agent, or Firm* — Marshall & Melhorn, LLC

(57) ABSTRACT

A vehicle seat, in particular a motor vehicle seat, having a first structural part (4), a second structural part (6) and at least one fitting (10) that can be locked and unlocked, the fitting (10) having a first fitting part (11), which is at least indirectly connected to the first structural part (4), and a second fitting part (12), which is at least indirectly connected to the second structural part (6). When the fitting (10) is unlocked, an angular position of the second structural part (6) relative to the first structural part (4) can be varied about an axis (A). In at least one angular position of the second structural part (6) relative to the first structural part (4), a spring element (100, 100.1, 200) braces the first fitting part (11) and the second fitting part (12) with respect to each other in the radial direction.

12 Claims, 5 Drawing Sheets

(56) References Cited

U.S. PATENT DOCUMENTS

| | | | | |
|---|---|---|---|---|
| 9,016,153 B2* | 4/2015 | Kirubaharan | B60N 2/2252 | 297/269.1 |
| 2006/0267391 A1* | 11/2006 | Becker | B60N 2/20 | 297/366 |
| 2008/0093907 A1* | 4/2008 | Nag | B60N 2/2356 | 297/367 R |
| 2009/0072605 A1* | 3/2009 | Otto | B60N 2/2252 | 297/361.1 |
| 2010/0171352 A1* | 7/2010 | Kienke | B60N 2/2254 | 297/362 |
| 2010/0244530 A1* | 9/2010 | Kitano | B60N 2/2252 | 297/362 |
| 2014/0077563 A1* | 3/2014 | Higashi | B60N 2/2356 | 297/367 R |
| 2014/0103693 A1* | 4/2014 | Yamada | B60N 2/236 | 297/354.12 |
| 2014/0110984 A1* | 4/2014 | Assmann | B60N 2/22 | 297/354.1 |
| 2014/0125105 A1* | 5/2014 | Yamada | B60N 2/2356 | 297/354.12 |
| 2014/0159458 A1* | 6/2014 | Lu | B60N 2/2356 | 297/366 |
| 2014/0203612 A1* | 7/2014 | Kirubaharan | B60N 2/22 | 297/354.12 |
| 2014/0225409 A1* | 8/2014 | Nagura | B60N 2/236 | 297/354.1 |
| 2014/0284984 A1* | 9/2014 | Yamada | B60N 2/2356 | 297/366 |
| 2015/0015044 A1* | 1/2015 | Teufel | B60N 2/0224 | 297/366 |
| 2015/0035339 A1* | 2/2015 | Endou | B60N 2/682 | 297/367 R |
| 2015/0061349 A1* | 3/2015 | Handl | B60N 2/2245 | 297/463.1 |
| 2015/0165936 A1* | 6/2015 | Wei | B60N 2/2356 | 297/367 P |
| 2015/0239371 A1* | 8/2015 | Nagura | B60N 2/12 | 297/366 |
| 2015/0266398 A1* | 9/2015 | Higashi | B60N 2/236 | 297/367 R |
| 2015/0298584 A1* | 10/2015 | Schuler | B60N 2/2254 | 297/361.1 |
| 2015/0298585 A1* | 10/2015 | Peters | B60N 2/20 | 297/370 |
| 2015/0321585 A1* | 11/2015 | McCulloch | B60N 2/236 | 297/367 P |
| 2016/0001679 A1* | 1/2016 | Thiel | B60N 2/2352 | 297/366 |
| 2016/0001680 A1* | 1/2016 | Thiel | B60N 2/2227 | 297/366 |

FOREIGN PATENT DOCUMENTS

| | | |
|---|---|---|
| DE | 10 2004 010 491 A1 | 9/2005 |
| DE | 20 2005 013 733 U1 | 11/2005 |
| DE | 10 2004 041 735 A1 | 3/2006 |
| DE | 10 2005 024 942 B4 | 10/2007 |
| EP | 1 747 936 A2 | 1/2007 |
| WO | 2005/068249 A1 | 7/2005 |
| WO | 2007/028506 A2 | 3/2007 |
| WO | 2014/053400 A1 | 4/2014 |

* cited by examiner

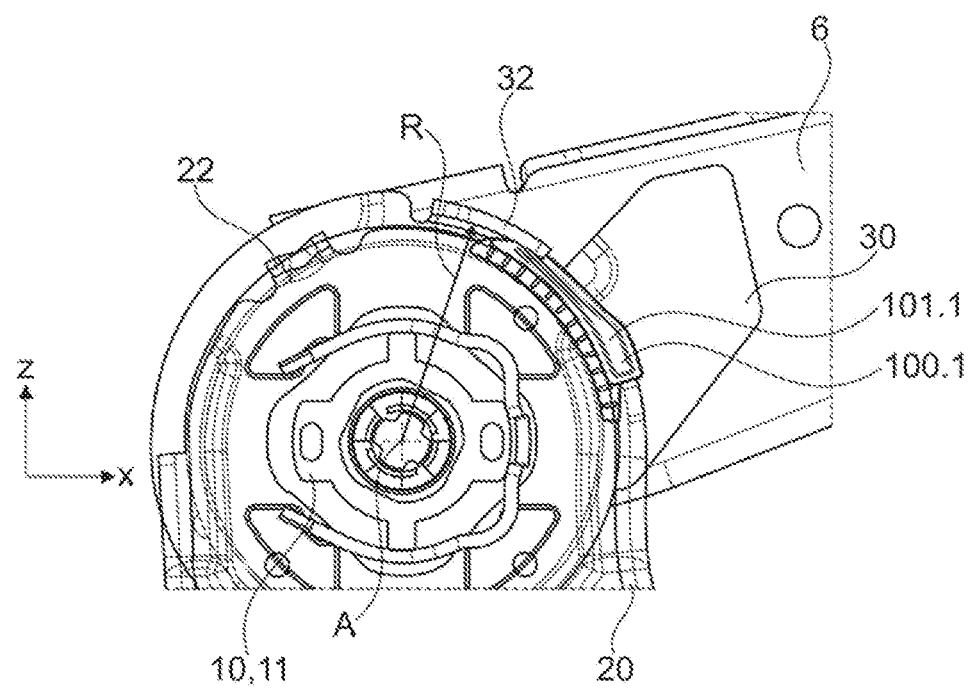
Fig. 10
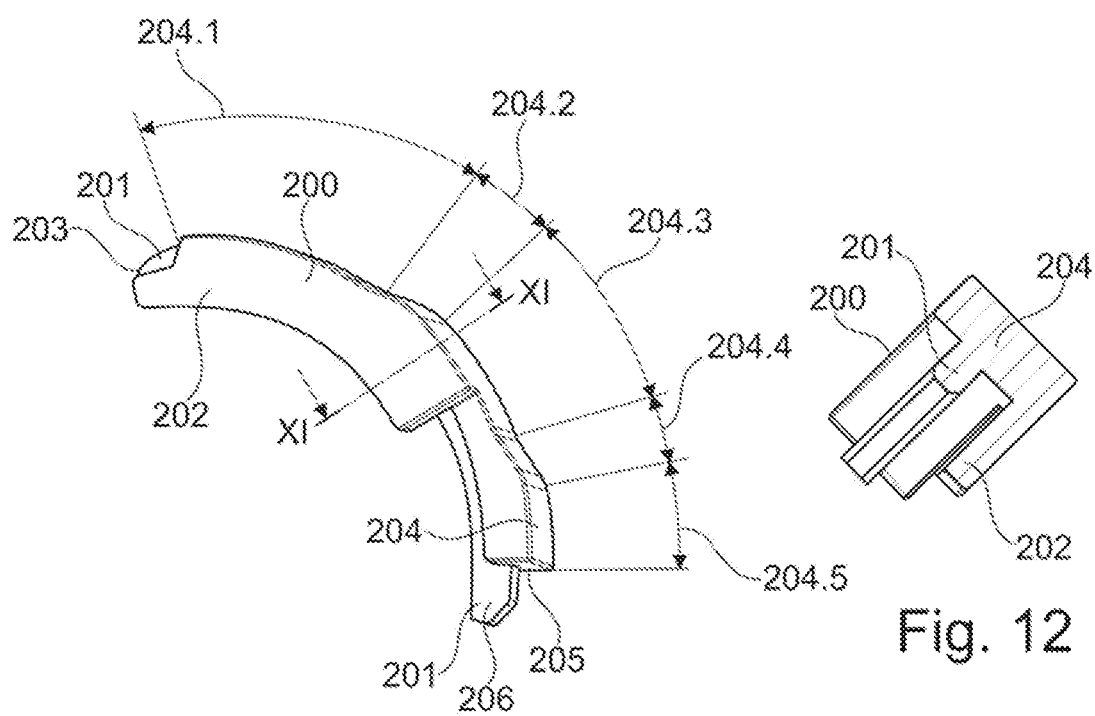
Fig. 11
Fig. 12

VEHICLE SEAT, IN PARTICULAR MOTOR VEHICLE SEAT

CROSS REFERENCE TO RELATED APPLICATIONS

This application is a United States National Phase Application of International Application PCT/EP2017/074675 filed Sep. 28, 2017 and claims the benefit of priority under 35 U.S.C. § 119 of German patent applications DE 10 2016 219 143.8, filed Oct. 4, 2016, and DE 10 2016 225 834.6 A1, filed Dec. 21, 2016, the entire contents of which are incorporated herein by reference.

FIELD OF THE INVENTION

The invention relates to a vehicle seat, in particular motor vehicle seat, having a first structural part, a second structural part and at least one fitting that can be locked and unlocked, the fitting having a first fitting part which is at least indirectly connected to the first structural part and a second fitting part which is at least indirectly connected to the second structural part, wherein, when the fitting is unlocked, an angular position of the second structural part relative to the first structural part can be varied about an axis.

BACKGROUND OF THE INVENTION

A latching fitting for a vehicle seat is disclosed in DE 103 34 220 A1, the latching fitting comprising a fitting lower part, a fitting upper part which is rotatably mounted on the fitting lower part and at least one toothed segment which is guided in a guide of the fitting lower part for locking the fitting upper part, wherein the guide forms at the same time the bearing for the fitting upper part. Spacers made of a plastics material are provided between the guide and the fitting upper part. By means of the spacers, in a normal case direct contact is avoided between the guide and the fitting upper part and undesired noise development in the bearing seat as a result of friction due to the same material pairing is prevented. The clearance required for the smooth rotation of the fitting upper part is reduced by the spacers, irrespective of an angular position between the fitting lower part and the fitting upper part.

DE 10 2004 041 735 A1 discloses a fitting for a vehicle seat having a first fitting part, a second fitting part, which is pivotable relative to the first fitting part about an axis, at least one holding clip for axially holding together the fitting parts and at least one slider for removing radial clearance between the fitting parts. The slider eliminates the radial clearance in all angular positions of the second fitting part relative to the first fitting part.

In a fitting disclosed in DE 10 2004 010 491 A1 having a first fitting part, a second fitting part which is mounted on the first fitting part and which is rotatable relative thereto about a central axis, and a clamping ring which is connected to the first fitting part and encompasses the second fitting part for axial securing, an intermediate ring is arranged between the clamping ring and the second fitting part. The intermediate ring compensates for radial clearance in all angular positions of the second fitting part relative to the first fitting part.

An intermediate ring which also acts in all angular positions and compensates for radial clearance between two fitting parts of a fitting is disclosed in DE 20 2005 013 733 U1.

DE 101 20 854 C1 discloses a geared fitting for a vehicle seat adjusting device having a first ring gear and a second ring gear, which is rotatably mounted relative thereto and axially arranged relative thereto, as central ring gears, and at least one circulating planetary gear which is arranged axially between the ring gears and which is in engagement with both ring gears, wherein the second ring gear is mounted on the first ring gear by the interposition of a wave-shaped and/or polygonal bearing bush.

SUMMARY OF THE INVENTION

The object of the invention is to improve a vehicle seat of the type mentioned in the introduction, in particular to avoid noise development due to radial clearance of the fitting in an unlocked state.

This object is achieved according to the invention by a vehicle seat, in particular motor vehicle seat, having a first structural part, a second structural part and at least one fitting that can be locked and unlocked, the fitting having a first fitting part which is at least indirectly connected to the first structural part and a second fitting part which is at least indirectly connected to the second structural part, wherein, when the fitting is unlocked, an angular position of the second structural part relative to the first structural part can be varied about an axis, wherein in at least one angular position of the second structural part relative to the first structural part, a spring element braces the first fitting part and the second fitting part with respect to each other in the radial direction, and in at least one further angular position of the second structural part relative to the first structural part, the spring element has no influence on the fitting. In at least one further angular position the spring element has no influence on the fitting, so that the spring element permits a low-friction adjustment of the fitting over defined angular ranges.

As in at least one angular position of the second structural part relative to the first structural part a spring element braces the first fitting part and the second fitting part relative to one another in the radial direction, in this angular position noise development due to the radial clearance of the fitting in an unlocked state is avoided. The fitting is preferably configured as a latching fitting, the principal mode of operation thereof being described, for example, in WO 2014/053400 A1.

Preferably, the first structural part is a seat part structure of a seat part and the second structural part is a backrest structure of a backrest, wherein the fitting serves for adjusting the inclination of the backrest. Preferably, the vehicle seat has two fittings, namely a fitting on each seat side. However, the fitting may also serve, for example, for the height adjustment of a vehicle seat or a seat cushion inclination adjustment of a vehicle seat. In principle, the invention may be used in any location where two structural parts are connected together by means of a fitting in the known manner.

The first fitting part may be connected to the seat part structure by means of a first adapter. However, a direct attachment of the first fitting part to the seat part structure is also possible. The second fitting part may be connected to the backrest structure by means of a second adapter. However, a direct attachment of the second fitting part to the backrest structure is also possible.

The vehicle seat may adopt at least one use position which is suitable for the transport of passengers, in which the backrest is substantially upright. For improving the comfort, the vehicle seat may adopt a plurality of use positions within an adjustment range, in particular in angular positions which are stepped relative to one another. The at least one fitting is locked in the at least one use position and optionally further use positions during the normal use of the vehicle seat for the transport of passengers. The vehicle seat may adopt a non-use position, in which the backrest is pivoted about the axis to the front relative to the use position. In the non-use position, the backrest is preferably pivoted into a substantially horizontal position. The rear face of the backrest may serve as loading floor in the non-use position. The fitting is preferably not locked in the non-use position. In the non-use position, the backrest may bear with a backrest cushion against a seat part cushion of the seat part.

In the use position, the spring element has no influence on the fitting so that the spring element permits a low-friction adjustment of the inclination of the backrest between a plurality of use positions. In the non-use position, the spring element is able to brace the first fitting part and the second fitting part relative to one another in the radial direction. In an intermediate position between the use position and the non-use position, the spring element is able to brace the first fitting part and the second fitting part relative to one another in the radial direction. The spring element is preferably wedge-shaped. The spring element preferably acts in the radial direction as a wedge between the two fitting parts. The spring element may have a lead-in chamfer extending in a wedge-shaped manner in the peripheral direction.

The spring element may be supported in the radial direction on one of the two fitting parts. The spring element may be fixedly fastened to said one of the two fitting parts. A finger is able to brace the spring element in the at least one angular position of the second structural part relative to the first structural part in the radial direction. The finger is able to pivot with the other of the two fitting parts about the axis. Preferably, the finger is fastened to a backrest structure or an adapter connected to the backrest structure. A radially inwardly facing internal surface of the finger may be curved in the peripheral direction with a radius about the backrest pivot axis.

When adopting at least one angular position, the finger may come into contact with a flange of the spring element. The flange may comprise at least one flange portion which is arranged further radially outwardly than a radially inwardly facing surface of the finger.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 10 is a side view of a detail of a vehicle seat according to the invention according to a modification of the first exemplary embodiment, wherein the backrest is located in a non-use position;

FIG. 11 is a perspective view of a spring element of a vehicle seat according to the invention, according to a second exemplary embodiment; and FIG. 12 is a sectional view through the spring element of FIG. 11 along the line XI-XI in FIG. 11.

DESCRIPTION OF THE PREFERRED EMBODIMENTS

Figure 1:
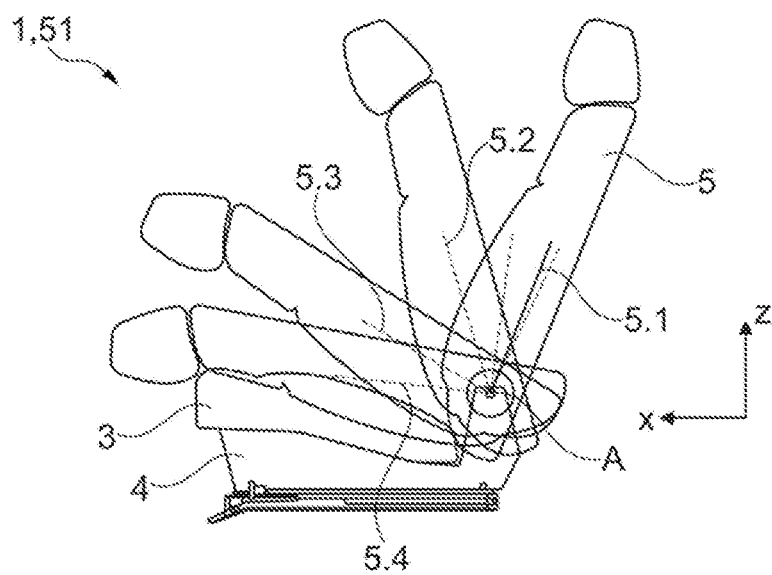
FIG. 1 is a schematic side view of a vehicle seat, wherein a backrest of the vehicle seat is shown in one of a plurality of use positions, a non-use position and two intermediate positions located between the use position and the non-use position.

The vehicle seat 1, 51, in particular for a motor vehicle, shown schematically in FIG. 1, is described hereinafter by using three spatial directions extending perpendicular to one another. A longitudinal direction x extends in a vehicle seat 1, 51 installed in the vehicle substantially horizontally and preferably parallel to a vehicle longitudinal direction which corresponds to the usual direction of travel of the vehicle. A transverse direction y extending perpendicular to the longitudinal direction x is also oriented horizontally in the vehicle and extends parallel to a vehicle transverse direction. A vertical direction z extends perpendicular to the longitudinal direction x and perpendicular to the transverse direction y. In a vehicle seat 1, 51 installed in the vehicle, the vertical direction z extends parallel to the vehicle vertical axis.

The positional and directional information used, such as for example front, rear, top and bottom, refers to a viewing direction of an occupant seated in the vehicle seat 1, 51 in the normal seating position, wherein the vehicle seat 1, 51 installed in the vehicle is oriented in a use position which is suitable for conveying passengers and in the conventional manner is oriented in the direction of travel. The vehicle seat 1, 51 according to the invention, however, may also be fitted in a different orientation, for example transversely to the direction of travel.

FIG. 1 shows a schematic side view of the vehicle seat 1, 51, wherein the backrest 5 is shown in a use position 5.1, a non-use position 5.4 and two intermediate positions 5.2, 5.3 located between the use position 5.1 and the non-use position 5.4. In the use position 5.1 the backrest 5 is slightly inclined to the rear relative to the vertical direction z. The use position of the backrest 5 serves, in particular, for the transport of passengers. In the non-use position 5.4 the backrest 5 is pivoted sufficiently far forward about an axis A extending parallel to the transverse direction y, also denoted hereinafter as the backrest pivot axis A, that the backrest 5 is arranged substantially horizontally and bears against the seat part 3. In the non-use position 5.4 the rear face of the backrest 5 may serve as a loading surface.

The vehicle seat 1, 51 has a seat part 3 and a backrest 5 which is adjustable relative to the seat part 3 in its inclination. For the unlocking and adjustment of the inclination of the backrest 5, a transmission rod is preferably rotated manually, for example by means of a control lever which is not shown in the figures and which is arranged horizontally in the transition region between the seat part 3 and the backrest 5 parallel to the transverse direction y. On both sides of the vehicle seat 1, 51 the transmission rod engages in one respective fitting 10. The transmission rod is aligned with the backrest pivot axis A.

The fitting 10 is configured in the present case as a latching fitting, the principal mode of operation thereof being described, for example, in WO 2014/053400 A1.

The fitting 10 has a first fitting part 11 and a second fitting part 12 which are rotatable relative to one another about the backrest pivot axis A. The backrest pivot axis A in the present case is aligned with the central axis of the transmission rod. The following terms used hereinafter refer to the backrest pivot axis A in the radial and in the peripheral direction. In each case, the two fitting parts 11, 12 may be approximately inscribed in a circular disk shape. A clamping ring 13 is provided for receiving axially acting forces, i.e. for axially holding together the fitting parts 11, 12.

The clamping ring 13 is fixedly connected to one of the two fitting parts 11, 12, in the present case in an external ring portion to the first fitting part 11, for example by means of laser welding. By means of an internal ring portion which is arranged in a plane perpendicular to the backrest pivot axis A, the clamping ring 13 encompasses the second fitting part 12 in the radial outer edge region thereof, optionally by the interposition of a sliding ring, without hindering the relative movement of the two fitting parts 11, 12. Thus the clamping ring 13 and the first fitting part 11 fixedly connected thereto clamp the second fitting part 12 which is movable relative thereto. From a structural point of view, the two fitting parts 11, 12 form together with the clamping ring 13 a disk-shaped unit.

The first fitting part 11 is fixedly connected by means of a first adapter 20 to a load-bearing seat part structure 4 of the seat part 3, i.e. fixed to the seat part. The second fitting part 12 is fixedly connected to a load-bearing backrest structure 6 of the backrest 5 by means of a second adapter 30, i.e. fixed to the backrest. The assignments of the fitting parts 11, 12, however, may also be reversed, i.e. the first fitting part 11 in this case is fixed to the backrest and the second fitting part 12 is fixed to the seat part.

The fitting 10 is located in the flux of force between the backrest 5 and the seat part 3. The first adapter 20 in the present case has a spring support tab 22 for controlling a spiral spring, not shown in the figures, for compensating for a weight force acting on the backrest 5. This spiral spring additionally acts on a finger 32 which protrudes in the transverse direction y from the second adapter 30 in the direction of the first adapter 20. The finger 32 in the present case is a sheet metal tab configured integrally with the second adapter 30. A radially inwardly facing internal surface of the finger 32 in the peripheral direction is curved with a radius R about the backrest pivot axis A.

In the present case the first fitting part 11 has four guide segments which, in each case in pairs with straight guide surfaces, guide a bolt laterally in the radial direction. The total of four bolts in the present case are offset in each case by 90° to one another in a constructional space defined between the two fitting parts 11, 12. The bolts are provided on their radially external end with a toothing which may be brought into engagement with a toothed rim of the second fitting part 12 which is configured as a ring gear. When the toothed rim and the bolts cooperate with one another, the fitting 10 is locked.

The second fitting part 12 is arranged in a recess of the first fitting part 11 and is encompassed radially outwardly thereby, whereby the two fitting parts 11, 12 bear one another. The second fitting part 12 may be mounted in the first fitting part 11. The relationships could, however, be exactly reversed, i.e. the first fitting part 11 may be mounted on the second fitting part 12. In principle, both arrangements are equivalent.

In the use position 5.1 of the backrest 5 the fitting 10 is in a locked state. In the locked state, the fitting parts 11, 12 are locked together in the radial direction substantially without clearance. In the non-use position 5.4 of the backrest 5 the fitting 10 is preferably in an unlocked state. In the unlocked state the fitting 10 has a radial clearance in order to ensure a smooth adjustment of the fitting 10. Due to the radial clearance, in an unlocked state of the fitting 10 the first fitting part 11 and the second fitting part 12 may be moved slightly toward one another in the radial direction, which during operation of the vehicle may lead to undesired noise development.

The arrangement described below of a spring element 100 according to a first exemplary embodiment of the vehicle seat 1 eliminates the radial clearance of the fitting 10 in the non-use position 5.4 of the backrest 5.

Figure 2:
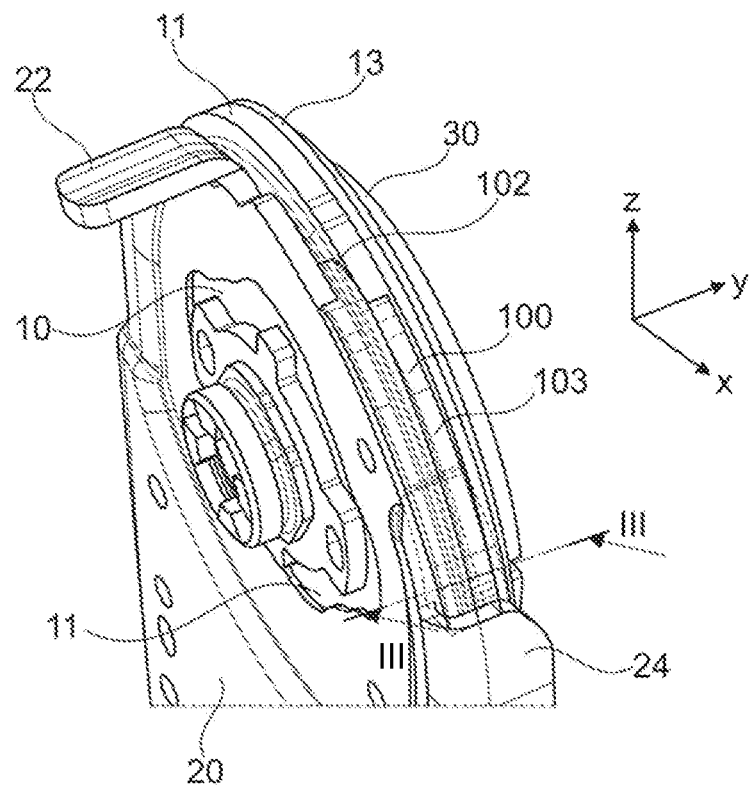
FIG. 2 is a perspective view of an arrangement having a fitting, a first adapter, a second adapter and a spring element of a vehicle seat according to the invention, according to a first exemplary embodiment.
Figure 3:
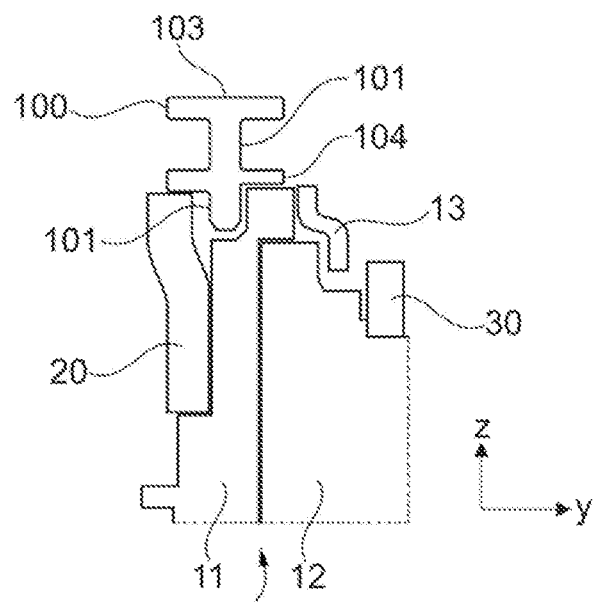
FIG. 3 is a sectional view through the arrangement of FIG. 2 along the line III-III in FIG. 2.
Figure 4:
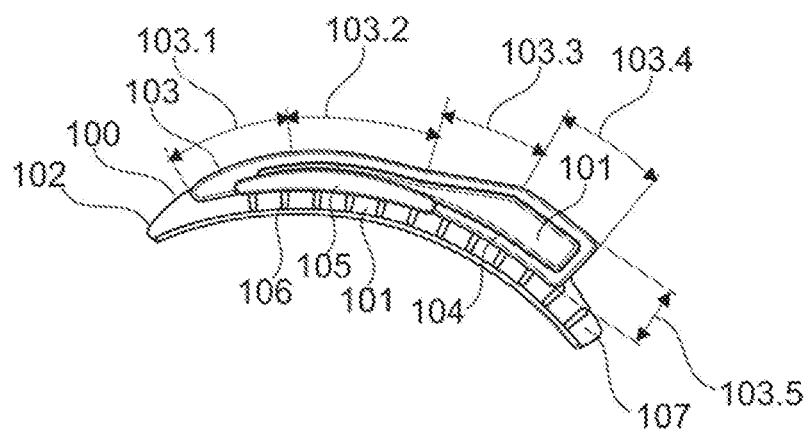
FIG. 4 is a side view of a spring element.
Figure 5:
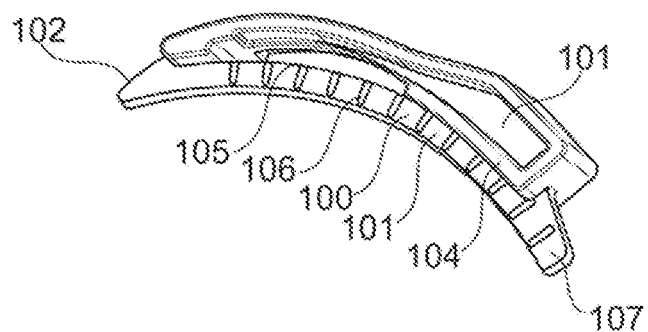
FIG. 5 is a perspective view of the spring element of FIG. 4.

FIGS. 2 and 3 show the arrangement of the spring element 100 on the fitting 10. FIGS. 4 and 5 show the spring element 100 as a separate part.

The spring element 100 is curved about the backrest pivot axis A, wherein individual geometries deviate from a circular arc shape about the backrest pivot axis A. The spring element 100 has a web 101 which extends relative to the backrest pivot axis A in the peripheral direction and perpendicular to the backrest pivot axis A. In an end region of the web 101 facing the finger 32, the web 101 has a lead-in chamfer 102. The lead-in chamfer 102 extends in a wedge-shaped manner in the peripheral direction. In the peripheral direction a flange 103 adjoins the lead-in chamfer 102, said flange partially forming a radially external contour of the spring element 100. The flange 103 protrudes on both sides over the web 101 in the transverse direction y. The web 101 is arranged centrally relative to the flange 103 in the transverse direction y. The finger 32 of the second adapter 30 protrudes over the flange 103, viewed in the transverse direction y.

In the peripheral direction, the flange 103 in a first flange portion 103.1 initially continues the radial inclination of the lead-in chamfer 102. Subsequently, the flange 103 in a second flange portion 103.2 remains approximately equidistant from the backrest pivot axis A. A radius of the outer surface of the second flange portion 103.2 is slightly larger than the radius R of the internal surface of the finger 32. In a third flange portion 103.3 adjoining the second flange portion 103.2, the spacing of the flange 103 increases further relative to the backrest pivot axis A. In a fourth flange portion 103.4 adjoining the third flange portion 103.3, once again the spacing of the flange 103 remains approximately equidistant from the backrest pivot axis A. A fifth flange portion 103.5 extends radially inwardly and transitions into an internal flange 104.

The internal flange 104 protrudes on both sides over the web 101 in the transverse direction y. The web 101 is arranged centrally relative to the internal flange 104 in the transverse direction y. The internal flange 104 extends in the peripheral direction along the third flange portion 103.3 and the fourth flange portion 103.4. The internal flange 104 extends substantially equidistant from the backrest pivot axis A. On the one hand, the web 101 is located radially further inward than the internal flange 104 and, on the other hand, the web 101 connects the internal flange 104 to the flange 103. The web 101 has an elongated opening 105 radially below the first flange portion 103.1 and the second flange portion 103.2. The opening 105 effects a greater flexibility of the first flange portion 103.1 and the second flange portion 103.2 radially inwardly than might be the case without the opening 105. As a result, the first flange portion 103.1 and the second flange portion 103.2 form a radially inwardly resilient region of the spring element 100.

The web 101 forms at its end remote from the lead-in chamfer 102 a nose 107 which protrudes in the peripheral direction over the fifth flange portion 103.5. The web 101 has a plurality of ribs 106 which are oriented in the radial direction and which are distributed over the periphery, preferably on both sides of the web 101.

The spring element 100 is fastened to the fitting 10. To this end, the region of the web 101 facing radially inwardly is inserted into a gap between the first fitting part 11 and the first adapter 20. The nose 107 engages below a displaced edge 24 of the first adapter 20 extending in the transverse direction y. In the peripheral direction, the fifth flange portion 103.5 additionally bears against a front face of the edge 24.

Figure 6:
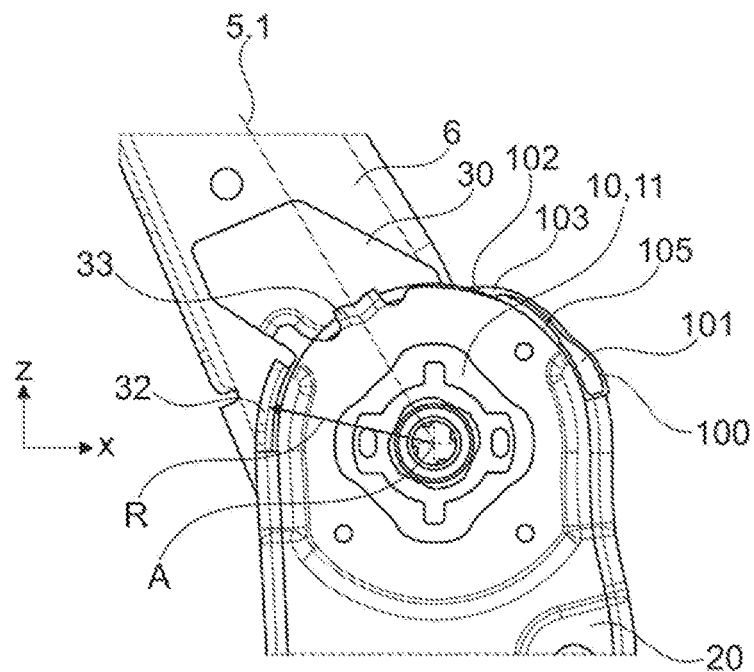
FIG. 6 is a side view of a detail of the arrangement of FIG. 2, wherein the backrest is located in a use position.
Figure 7:
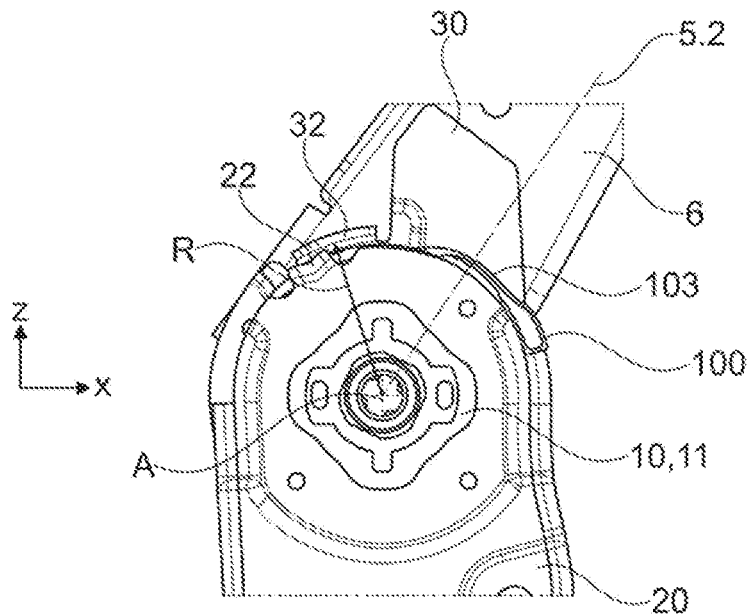
FIG. 7 is a side view corresponding to FIG. 6, wherein the backrest is located in a first intermediate position.
Figure 8:
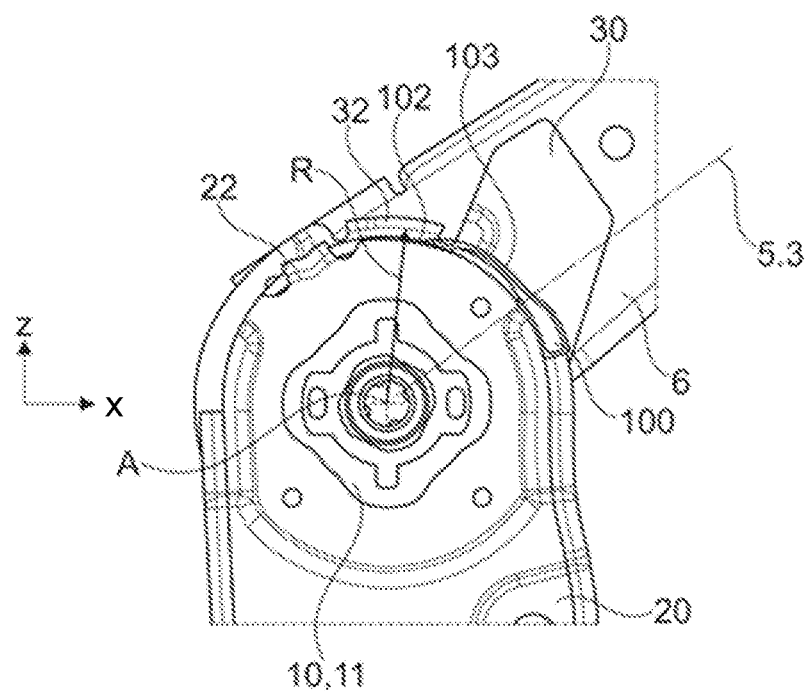
FIG. 8 is a side view corresponding to FIG. 6, wherein the backrest is located in a second intermediate position.
Figure 9:
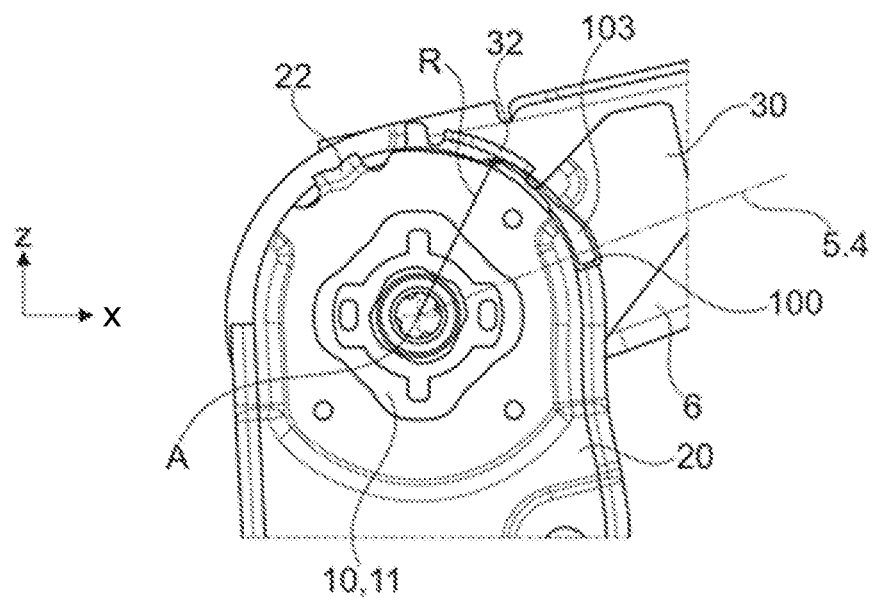
FIG. 9 is a side view corresponding to FIG. 6, wherein the backrest is located in a non-use position.

The mode of operation of the spring element 100 is visible in FIGS. 6 to 9. FIG. 6 shows the backrest structure 6 in the use position 5.1. The finger 32 in the use position 5.1 is spaced apart from the spring element 100 in the peripheral direction. Also in the first intermediate position 5.2 shown in FIG. 7, the finger 32 which pivots with the backrest structure 6 in the peripheral direction is still spaced apart from the spring element 100. In the second intermediate position 5.3 a leading edge of the finger 32 in the peripheral direction has reached the lead-in chamfer 102 and with a further pivoting of the backrest structure 6 about the backrest pivot axis A comes into contact with the first flange portion 103.1. FIG. 9 shows the non-use position 5.4 in which the finger 32 covers the first flange portion 103.1 and partially overlaps the second flange portion 103.2. As the second flange portion 103.2 is located further radially outwardly than the radially inwardly facing internal surface of the finger 32, which is curved with the radius R about the backrest pivot axis A, the spring element 100 is compressed and braced by the finger 32 in the radial direction. By a resulting radially-acting spring force of the spring element 100 the finger 32 and thereby the second fitting part 12, which is fixedly connected to the finger 32 via the second adapter 30, are pretensioned in the radial direction relative to the first fitting part 11 on which the spring element 100 is supported via the internal flange 104. The spring element 100 exerts a wedge effect between the two fitting parts 11, 12. Due to the radial pretensioning between the first fitting part 11 and the second fitting part 12 noise development of the fitting 10 which is unlocked in the non-use position 5.4 is avoided.

FIG. 10 shows a modification of the first exemplary embodiment which differs from the first exemplary embodiment merely in that with a spring element 100.1 the web 101.1 is unopened, i.e. an opening which corresponds to the previously described opening 105 is not present. In order to achieve effective spring properties of the spring element 100.1, however, the spring element 100.1 is preferably produced from a relatively flexible material.

FIGS. 11 and 12 show a spring element 200 of a second exemplary embodiment of a vehicle seat 51 according to the invention. Apart from the spring element 200, the vehicle seat 51 corresponds with regard to function and structure to the vehicle seat 1 of the first exemplary embodiment, the description thereof also applying to the vehicle seat 51 of the second exemplary embodiment with the exception of the different details described hereinafter. In this regard, FIG. 1 shows schematically both the vehicle seat 1 of the first exemplary embodiment and the vehicle seat 51 of the second exemplary embodiment.

The spring element 200 is curved around the backrest pivot axis A, wherein individual geometries differ from a circular arc shape about the backrest pivot axis A. The spring element 200 has a first web 201 and a second web 202 which both extend relative to the backrest pivot axis A in the peripheral direction and perpendicular to the backrest pivot axis A. The two webs 201, 202 are arranged spaced apart from one another in the axial direction. The second web 202 in the peripheral direction is shorter than the first web 201. In an end region of the first web 201 facing the finger 32, the first web 201 has a lead-in chamfer 203.

In the peripheral direction a flange 204 adjoins the lead-in chamfer 203, said flange partially forming a radially external contour of the spring element 200. On the one hand, the flange 204 is defined in the axial direction by the second web 202 and, on the other hand, the flange 204 protrudes over approximately half its length laterally over the first web 201. Over approximately the second half of its length the flange 204 is defined in the axial direction by the first web 201.

In the peripheral direction the flange 204 has a first flange portion 204.1 which extends approximately equidistant from the backrest pivot axis A. A radius of the outer surface of the first flange portion 204.1 is slightly smaller than the radius R of the internal surface of the finger 32. In the peripheral direction a second flange portion 204.2 adjoins the first flange portion 204.1. The second flange portion 204.2 has an inclination in the radial direction. In this case, an end region of the second flange portion 204.2 remote from the finger 32 protrudes radially over the radius R. Subsequently, the flange 204 in a third flange portion 204.3 remains approximately equidistant from the backrest pivot axis A. A radius of the outer surface of the third flange portion 204.3 is slightly larger than the radius R of the internal surface of the finger 32. In a fourth flange portion 204.4 the spacing from the backrest pivot axis A adjoining the third flange portion 204.3 increases again. In a fifth flange portion 204.5 adjoining the fourth flange portion 204.4, once again the spacing remains approximately equidistant from the backrest pivot axis A. At the end of the fifth flange portion 204.5 a front face 205 extends radially inwardly.

The first web 201 forms at its end remote from the lead-in chamfer 203 a nose 206 which in the peripheral direction protrudes over the fifth flange portion 204.5.

The spring element 200 is fastened to the fitting 10. To this end, in a mounted state of the spring element 200, a peripheral step of the second fitting part 12 10 is received between the two webs 201, 202. As a result, the spring element 200 is fixed in the transverse direction y. The nose 206 engages below a displaced edge 24 of the first adapter 20 extending in the transverse direction y. In the peripheral direction, the front surface 205 additionally bears against a front surface of the edge 24.

The mode of operation of the spring element 200 is similar to the description of the FIGS. 6 to 9, wherein in the non-use position 5.4 the spring element 200 is compressed and is able to be braced by the finger 32 in the second flange portion 204.2 in the radial direction.

The features disclosed in the above description, the claims and the drawings may be significant both individually and also in combination with one another for implementing the invention in its various embodiments.

While specific embodiments of the invention have been shown and described in detail to illustrate the application of the principles of the invention, it will be understood that the invention may be embodied otherwise without departing from such principles.

The invention claimed is:

1. A vehicle seat, comprising:
   a first structural part;
   a second structural part; and
   at least one fitting configured to be locked and unlocked, the at least one fitting having a first fitting part at least indirectly connected to the first structural part and a second fitting part at least indirectly connected to the second structural part,
   wherein, when the at least one fitting is unlocked, an angular position of the second structural part relative to the first structural part can be varied about an axis,
   wherein in at least one angular position of the second structural part relative to the first structural part a spring element braces the first fitting part and the second fitting part with respect to each other in a radial direction, and in at least one further angular position of the second structural part relative to the first structural part, the spring element has no influence on the at least one fitting;
   wherein the first structural part is a seat part structure of a seat part and the second structural part is a backrest structure of a backrest
   wherein the vehicle seat comprises a use position suitable for transporting passengers, in which the backrest is substantially upright, and the vehicle seat comprises a non-use position in which the backrest is pivoted about the axis to the front relative to the use position;
   wherein in the use position the spring element has no influence on the fitting and in the non-use position the spring element braces the first fitting part and the second fitting part relative to one another in the radial direction.

2. The vehicle seat as claimed in claim 1, wherein the first fitting part is connected to the seat part structure by an adapter.

3. The vehicle seat as claimed in claim 1, wherein the second fitting part is connected to the backrest structure by an adapter.

4. The vehicle seat as claimed in claim 1, wherein in the non-use position the backrest is pivoted into a substantially horizontal position.

5. The vehicle seat as claimed in claim 1, wherein the spring element is supported in the radial direction on one of the first fitting part and the second fitting part and the spring element is fixedly fastened to the one of the first fitting part and the second fitting part, and a finger braces the spring element in the at least one angular position of the second structural part relative to the first structural part in the radial direction.

6. The vehicle seat as claimed in claim 5, wherein the finger pivots with another one of the first fitting part and the second fitting part about the axis.

7. The vehicle seat as claimed in claim 6, wherein a radially inwardly facing internal surface of the finger is curved in a peripheral direction with a radius about the axis.

8. The vehicle seat as claimed in claim 5, wherein the finger is fastened to the second structural part or an adapter connected to the second structural part, the second structural part being a backrest structure.

9. The vehicle seat as claimed in claim 5, wherein when adopting at least one angular position the finger comes into contact with a flange of the spring element.

10. The vehicle seat as claimed in claim 9, wherein the flange comprises at least one flange portion arranged further radially outwardly than a radially inwardly facing surface of the finger.

11. The vehicle seat as claimed in claim 1, wherein the spring element is of wedge-shaped configuration in a peripheral direction.

12. The vehicle seat as claimed in claim 1, wherein the spring element has a lead-in chamfer extending in a wedge-shaped manner in a peripheral direction.

* * * * *